United States Patent
Li (10) Patent No.: US 12,408,025 B2
(45) Date of Patent: Sep. 2, 2025

(54) PRE-DOWNLOAD CUSTOMIZATION OF ELECTRONIC SUBSCRIBER IDENTITY MODULE (eSIM)

(71) Applicant: DISH Wireless L.L.C., Englewood, CO (US)

(72) Inventor: Yongjia Li, Greenwood Village, CO (US)

(73) Assignee: DISH Wireless L.L.C., Englewood, CO (US)

( * ) Notice: Subject to any disclaimer, the term of this patent is extended or adjusted under 35 U.S.C. 154(b) by 387 days.

(21) Appl. No.: 18/110,690

(22) Filed: Feb. 16, 2023

(65) Prior Publication Data

US 2024/0284165 A1   Aug. 22, 2024

(51) Int. Cl.
   *H04W 8/24*   (2009.01)
   *H04W 8/18*   (2009.01)
(52) U.S. Cl.
   CPC .......... *H04W 8/245* (2013.01); *H04W 8/183* (2013.01)
(58) Field of Classification Search
   CPC ...... H04W 8/245; H04W 8/183; H04W 8/205
   See application file for complete search history.

(56) References Cited

U.S. PATENT DOCUMENTS

| 2022/0141644 A1* | 5/2022 | Shah | H04W 8/205 |
| | | | 370/329 |
| 2022/0408240 A1* | 12/2022 | Ramasamy | H04W 8/205 |
| 2024/0196196 A1* | 6/2024 | Radier | H04W 12/40 |

* cited by examiner

*Primary Examiner* — Christopher M Brandt
(74) *Attorney, Agent, or Firm* — Fish & Richardson P.C.

(57) ABSTRACT

Methods, systems, and apparatus, including computer programs encoded on computer storage media, for modifying subscriber identity module (SIM) profiles at a remote SIM provisioning (RSP) platform. One of the methods includes receiving a request to modify at least one eSIM profile. The request can be received through a user-interface configured to receive user-inputs to modify eSIM profiles stored in a repository. The user-inputs can be related to modifying the eSIM profiles prior to the eSIM profiles being downloaded on corresponding mobile devices. The method includes retrieving the at least one eSIM profile from eSIM profiles in a repository. The method includes modifying at least one element of the at least one eSIM profile in accordance with the request to modify the at least one eSIM profile, and storing the modified eSIM profile for download to a mobile device.

20 Claims, 4 Drawing Sheets

PRE-DOWNLOAD CUSTOMIZATION OF ELECTRONIC SUBSCRIBER IDENTITY MODULE (eSIM)

BACKGROUND

Subscriber identity module (SIM) cards are used to connect a device to a wireless network. Electronic SIM (eSIM) profiles can be downloaded and installed on an embedded universal integrated circuit card (EUICC) of a mobile device.

SUMMARY

In general, one innovative aspect of the subject matter described in this specification can be embodied in methods that include the actions of receiving, by at least one processing device through a user-interface configured to receive user-inputs to modify electronic subscriber identity module (eSIM) profiles stored in a repository, a request to modify at least one eSIM profile, wherein the user-inputs are related to modifying the eSIM profiles prior to the eSIM profiles being downloaded on corresponding mobile devices; retrieving, by the at least one processing device, the at least one SIM profile from the eSIM profiles in the repository; modifying, by the at least one processing device, at least one element of the at least one SIM profile in accordance with the request to modify the at least one eSIM profile; and storing, by the at least one processing device, the modified eSIM profile for download to a mobile device.

Other embodiments of these aspects include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment includes all the following features in combination.

In some implementations, the user-inputs to modify the eSIM profiles modify a display of custom branding information on the mobile device, and the at least one element of the SIM profile includes at least one branding element.

In some implementations, the user-inputs to modify the eSIM profiles modify wireless network selection, and the at least one element of the eSIM profile comprises at least one wireless network selection element.

In some implementations, each SIM profile stored in the repository corresponds to a wireless service provider.

In some implementations, modifying the at least one element of the SIM profile includes decrypting the at least one SIM profile to access elements of the at least one SIM profile; calculating, after the at least one SIM profile is modified, integrity vales for the modified SIM profile; and encrypting the integrity vales together with the modified SIM profile.

In some implementations, the user-interface includes interactive controls which enable a user to edit contents of the at least one element of the at least one SIM profile.

In some implementations, the user-interface includes interactive controls which enable a user to select a functionality from a set of functionalities, In some implementations, the methods can include the actions of in response to receiving the selection of the functionality, modifying the at least one element with contents to configure the at least one SIM profile to perform the selected functionality after download to the mobile device.

In some implementations, the methods can include the actions of in response to receiving a request from the mobile device, providing the SIM profile to the mobile device.

The subject matter described in this specification can be implemented in particular embodiments so as to realize one or more of the following advantages. Modifying eSIM profiles before being downloaded to mobile devices allows eSIM profiles to be customized without requiring the use of over the air (OTA) communications. Pre-download customization of eSIM profiles reduces required server resources and network traffic because eSIM profiles only need to be provisioned to mobile devices once. This is advantageous over OTA customizations which require eSIM profiles to be provisioned both when they are initially downloaded and when they are modified. Only requiring a single provisioning session also increases security by eliminating all of the security vulnerabilities (e.g., a man in the middle attack) of a second provisioning. Pre-download customization of eSIM profiles reduces the chance of desynchronization between the network service provider and the mobile device (e.g, the network service provider and the mobile device may maintain different statuses of an eSIM profile installed on the mobile device after an OTA customization). A user interface can be provided which limits which elements of eSIM profiles can be modified in order to prevent corruption of the eSIM profile and insure the integrity of the eSIM profile is maintained. Pre-download customization of eSIM profiles also helps to ensure that the final content of the profile is expected, since OTA customization delivery is not 100% successful due to various reasons (e.g. interruption of the continuous OTA communication, customer's location, etc). Modifying eSIM profiles at a remote SIM provisioning (RSP) platform also helps to better manage and monitor eSIM profiles in one system, since what you get is what you see, after a successful one-step download of the eSIM profile.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes technology that allows for the contents of an electronic subscriber identity module (eSIM)

profile to be modified prior to being downloaded to a mobile device. The contents of the eSIM profile can be modified, for example, to customize the user experience (e.g., displayed branding information) on the mobile device. Typically, after being generated, eSIM profiles are stored in remote SIM provisioning (RSP) platforms without the ability to change the contents of the eSIM profiles. Without the advantage of the technology described herein, an eSIM profile must first be downloaded to a mobile device, and then updated using over the air (OTA) communications in order to change the contents of the eSIM profile. This requires multiple sequences of communications between the mobile device and server systems, which increases complexity and the potential for errors (e.g., corruption of the eSIM profile). The updated eSIM profiles must be verified that they still correctly connect to the wireless network and that no error is introduced. Additional server resources are required for OTA updates, which increases maintenance costs. For example, a server associated with the vendor of the eSIM profiles (e.g., where the eSIM profiles are stored prior to download) is typically different from the server that provides the OTA updates, thereby requiring coordination among multiple server systems.

The technology described herein can address the issues described above by allowing eSIM profiles to be modified while they are stored at the RSP platform. This can avoid the need for OTA updates after the eSIM profiles are downloaded to respective mobile devices. The RSP platform can provide user-interfaces that allows the owners of the eSIM profiles (e.g., the wireless service provider) to edit/update/modify the contents of a particular eSIM profile or a group of eSIM profiles prior to the profiles being downloaded on respective end-user mobile devices. For example, wireless service providers which own the eSIM profiles can access a portal provided by the RSP platform. The portal can include a graphical user interface to edit elements of the eSIM profiles. The portal can allow the operator to modify a single eSIM profile or a batch-process multiple eSIM profiles. The operator can select particular eSIM profiles which include functionalities to access particular wireless networks. The eSIM profile can then be retrieved from a SIM repository, decrypted to access the elements of the eSIM profile, and edited/modified/updated according to the selections received from the eSIM owner. After the eSIM profile is modified, the modified eSIM profile is re-encrypted and stored in the repository so that the eSIM profile can be provided to a mobile device.

Figure 1:
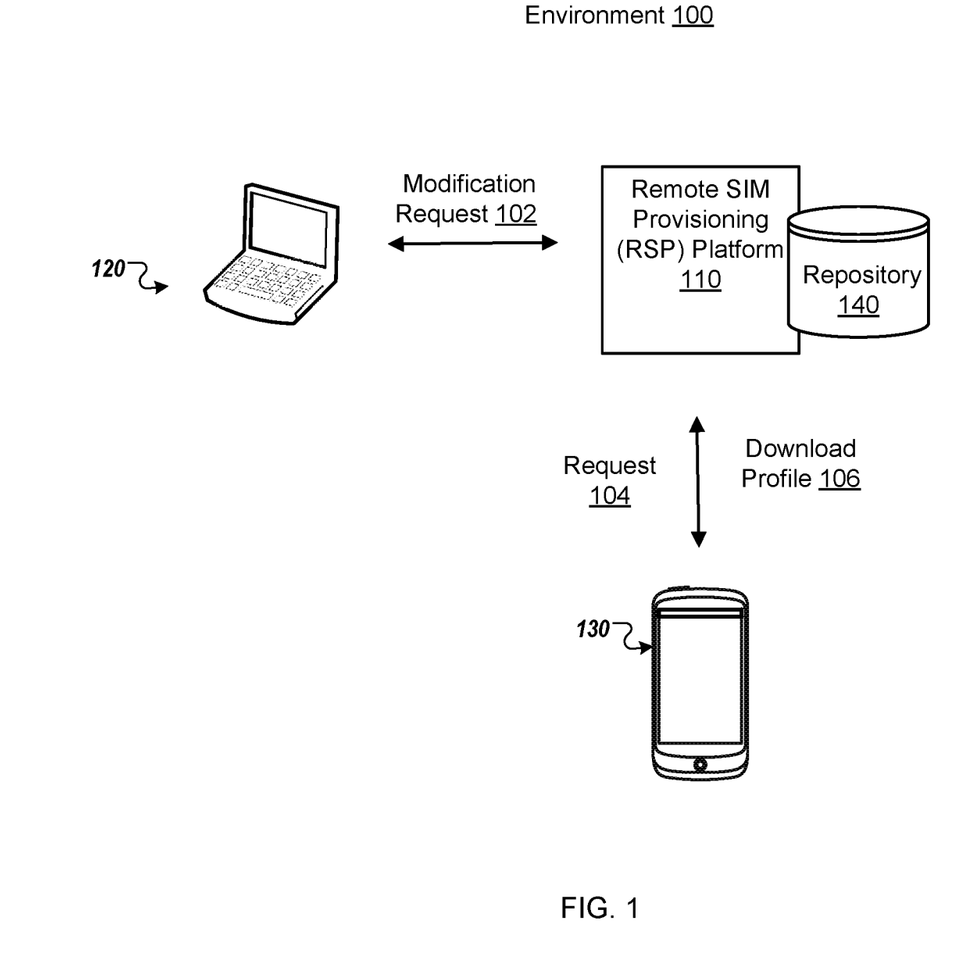
FIG. 1 is an example environment for modifying eSIM profiles.

FIG. 1 is an example environment 100 for modifying eSIM profiles. The environment 100 includes a RSP platform 110, computing device 120, and a mobile device 130 (e.g., a user-equipment (UE)). The RSP platform 110 receives a request 102 to modify at least one electronic subscriber identity module (eSIM) profile stored in a repository 140. The request can be received from computing device 120 and through a user-interface (UI) (e.g., the UI 200 described below with reference to FIG. 2). For example, the UI can be provided on the computing device 120 to an owner (or potential customer) of the eSIM profile. The owner of the eSIM profile can include a wireless service provider which purchases eSIM profiles from a vendor (e.g., developer and seller of eSIM profiles). In some embodiments, the RSP platform 110 can be maintained by the vendor, and can provide the UI to the owner of the eSIM profiles. The owner can allocate the eSIM profiles which it owns to customers of its wireless service.

Figure 2:
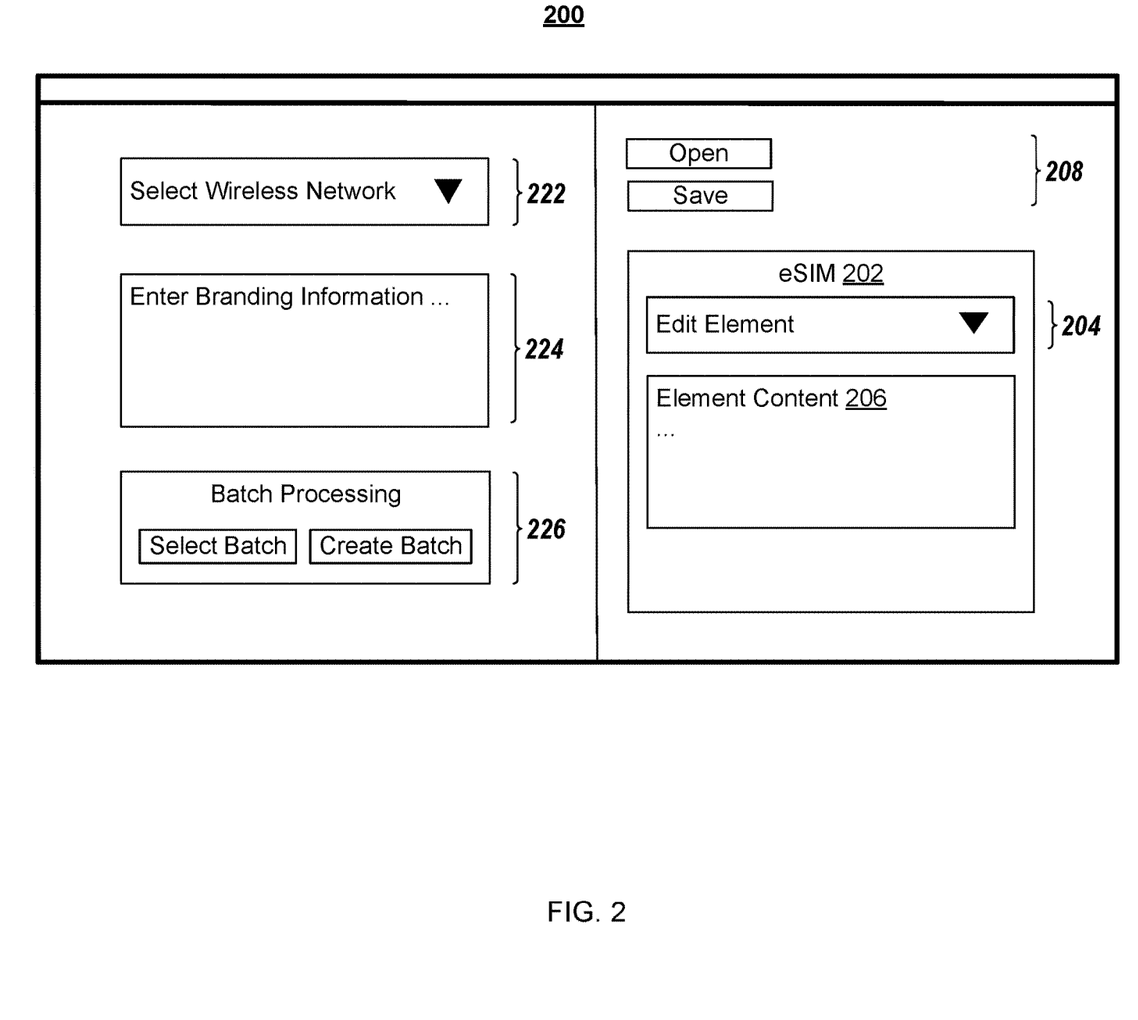
FIG. 2 shows an example of a user interface that can be provided to modify eSIM profiles.

The RSP platform 110 can receive the request 102 to modify the eSIM profile based on user interactions with the UI (e.g., user interactions with the interactive controls of FIG. 2). An owner (e.g., wireless service provider) of the eSIM profile may provide the choice of multiple wireless services to its customers. For example, the owner can provide different services (e.g., coverage, speed, 4G, and/or 5G) within the owner's wireless network (e.g., hardware and software communication resources) and/or on wireless networks leased from other wireless service providers. The multiple wireless services can include different branding information which is displayed on the mobile device 130. eSIM profiles can correspond to a particular wireless service of the multiple wireless services (e.g., the eSIM profile can be configured to connect to the resources corresponding to the particular wireless network). The eSIM profile can be updated to reflect the corresponding branding information of the particular wireless service.

The RSP platform 110 can be configured to retrieve the requested eSIM profiles from the eSIM profiles stored in the repository 140. In some embodiments, the RSP platform 110 can retrieve eSIM profiles based on a corresponding wireless service provider. For example, the eSIM profiles can be configured to allow a mobile device to communicate with RAN resources of a particular wireless service provider. The repository 140 can store the corresponding wireless service provider for each of the stored eSIM profiles. The repository 140 can store newly created eSIM profiles, modified eSIM profiles, and/or eSIM profiles imported from another repository.

The contents of eSIM profiles can be encrypted (e.g., protected with keys) while stored in the repository 140. The RSP platform 110 can be configured to decrypt the eSIM profiles to access elements of the eSIM profiles. After the eSIM profile is decrypted, the elements of the eSIM profile can be modified, for example, based on the modification request 102.

The RSP platform 110 can modify eSIM profiles by modifying at least one element of the eSIM profiles in accordance with the modification request 102. In some embodiments, the modification request 102 can include modifications (e.g., edits, revisions) to particular elements of the eSIM profile. In such embodiments, the RSP platform 110 can modify the eSIM profile according to the modifications to the elements. For example, elementary files (EF) (e.g., data items) of the eSIM profile can be updated according to the modifications. In some embodiments, the modification request can include a revised element to replace an element of the eSIM profile. For example, the UI can receive a selection of an entire element (e.g., through a selection of a file) to replace a corresponding element of the eSIM profile.

In some embodiments, the modification request 102 can include modifications pertaining to an end user experience (e.g., branding information which appears on the mobile device 130 after the eSIM profile is downloaded). The RSP platform 110 can modify an eSIM profile such that when downloaded on to the mobile device 130, the eSIM profile causes a display of custom branding information on the mobile device 130. For example, the RSP platform 110 can modify at least one branding element of an eSIM profile. In some examples, different eSIM profiles for a single wireless service provider can be modified with different branding information.

The branding elements of an eSIM profile can include group identifier (level 1) (GID1), group identifier (level 2) (GID2), operator public land mobile network (PLMN) list (OPL), and PLMN Network Name (PNN). The branding elements can controls how the mobile service is displayed to the end customers (e.g., a mobile service shown at the top of the mobile device 130). GID1 and GID2 can control whether a mobile device is locked. For example, a mobile service provider could prevent a phone from using certain eSIM profiles. In some examples, the modified eSIM profile may prevent the mobile device from replacing the modified eSIM profile with another eSIM profile.

In some embodiments, the modification request 102 can include modifications to wireless network selection (e.g., how the mobile device 130 selects which network resources to connect to). In such embodiments, the RSP platform 110 can modify at least one wireless network selection element of an eSIM profile. The wireless network selection elements can include functional elements which control how the network is selected. For example, the wireless network selection elements can include equivalent home public land mobile network (EHPLMN), HPLMN selector with access technology (HPLMNwACT), and/or operator controlled PLMN selector with access technology (OPLMNwACT). For example, the RSP platform 110 can add a roaming partner to the elements of the eSIM profile.

In some embodiments, a single eSIM profile can be modified according to the modification request. In some embodiments, the RSP platform 110 can batch-process multiple eSIM profiles. For example, the modification request 102 can include an identifier (e.g., batch number) to identify the group of eSIM profiles to be modified.

In some embodiments, the RSP platform 110 can calculate integrity values for the modified eSIM profiles after eSIM profiles are modified. For example, the integrity of the eSIM profiles can be protected to ensure the content is not changed (e.g., by untrusted sources, through errors during transmissions, by a man in the middle attack). When an eSIM profile is received, the integrity values (e.g., integrity check values, an integrity key) can be used to check the contents. After an eSIM profile is modified, the integrity can be re-calculated and stored, to account for the updated content of the modified eSIM profile.

The RSP platform 110 can store the modified eSIM profile for download to a mobile device. For example, the RSP platform 110 can provide functionalities to modify eSIM profiles prior to the eSIM profiles being downloaded on corresponding mobile devices. The RSP platform 110 can encrypt the modified eSIM profiles (e.g., in response to receiving a request to save a modified eSIM profile), and store the encrypted eSIM profile. The modified eSIM profiles can be encrypted together with the calculate integrity vales.

The RSP platform 110 can receive a request 104 to download an eSIM profile. The request 104 can be received from the mobile device 130. The RSP platform 110 can provide the eSIM profile 106 to the mobile device in response to receiving the request 104. The eSIM profile can be provisioned for the mobile device 130 and used to connect to a corresponding wireless network.

In some embodiments, the RSP platform 110 can modify eSIM profiles in real time (e.g., after a customer buys a mobile service from a store, and after an eSIM profile is requested by a corresponding mobile device). For example, a customer can purchase a particular brand of mobile service. On receiving information indicative of the purchase, the RSP platform 110 can modify an eSIM profile based on the particular brand of mobile service. In some examples, the RSP platform 110 can receive a request from the mobile device 130 for an eSIM profile with particular branding information. The RSP platform 110 can modify an eSIM profile based on the particular branding information, and provide the modified eSIM profile to the mobile device 130.

FIG. 2 shows an example of a user interface (UI) 200 that can be provided to modify eSIM profiles. For example, the UI 200 can be provided by the RSP platform 110 to the computing device 120 from FIG. 1. The UI 200 can provide functionality for a customer/owner of an eSIM profile to request and/or make changes to the contents of the eSIM profile. The UI 200 can be configured to receive user-inputs to modify eSIM profiles stored in a repository. The UI 200 can receive the user-inputs through multiple elements that include controls for modify eSIM profiles.

In some embodiments, the UI 200 can include interactive controls 204 and 206 which enable a user to edit contents of the at least one element of the eSIM profile 202. The interactive controls 204 can enable a user to select an element of the eSIM profile 202 to edit. The interactive controls 206 can display the contents of the selected element, and provide a text editing functionality to allow the user to modify the contents of the selected element. The interactive controls 208 can enable a user to open a new eSIM profile and save an eSIM profile after it is modified. In some embodiments, the UI 200 can limit the content which the user can modify. For example, the UI 200 can provide functionality to change certain content, and not provide functionality to change protected content (e.g., the user can be prevented from changing keys of the eSIM profile).

In some embodiments, the UI 200 can include interactive controls which enable a user to select a functionality from a set of functionalities. In response to receiving the selection of the functionality, an RSP platform can modify the at least one element with contents to configure the at least one eSIM profile to perform the selected functionality after download to a mobile device. The interactive controls 222 enable a user to select a wireless network corresponding an eSIM profile. For example, a user may desire to modify an eSIM profile which can be used to connect to a certain wireless network. In some embodiments, the eSIM profile 202 (e.g., which corresponds to the selected wireless network) may open in response to receiving the selection of the wireless network. The interactive controls 224 enable a user to enter the branding information for the eSIM profile. The RSP platform can modify the content corresponding to the selected branding information. For example, the RSP platform can receive the branding information, determine which elements of the eSIM profile need to be modified, and update the corresponding elements. The UI 200 can include interactive controls 226 to enable a user to modify a batch of eSIM profiles. The interactive controls 226 can enable the user to select an existing batch of eSIM profiles or create a new batch of eSIM profiles. In some embodiments, after a batch is specified, all modifications received through the UI 200 can be applied to all eSIM profiles in the batch.

Figure 3:
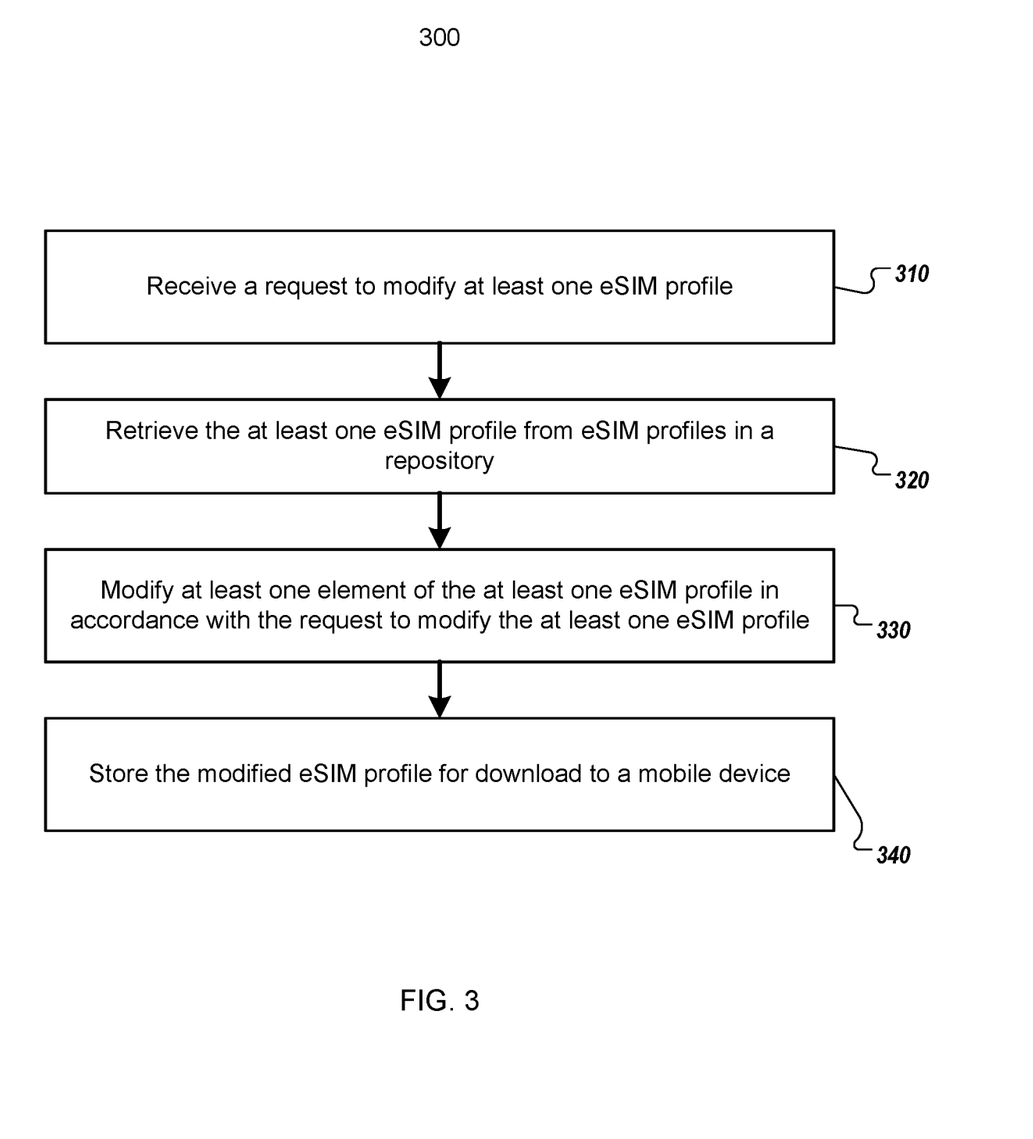
FIG. 3 is a flow diagram of an example process for modifying an eSIM profile.

FIG. 3 is a flow diagram of an example process 300 for modifying an eSIM profile. For example, the process 300 can be used by an RSP platform, e.g., the RSP platform 110 from the environment 100. The RSP platform receives a request to modify at least one eSIM profile (310). The request can be received through a user-interface configured to receive user-inputs to modify eSIM profiles stored in a repository. The user-interface can include interactive controls which enable a user to edit contents of the at least one element of the at least one SIM profile and/or select a functionality from a set of functionalities.

The RSP platform retrieves the at least one eSIM profile from eSIM profiles in a repository (320). Each SIM profile stored in the repository can correspond to a wireless service provider. The RSP platform can decrypting the retrieved SIM profiles to access elements of the SIM profiles.

The RSP platform modifies at least one element of the at least one eSIM profile in accordance with the request to modify the at least one eSIM profile (330). The RSP platform can modify the eSIM profiles prior to the eSIM profiles being downloaded on corresponding mobile devices. The RSP platform can modify elements of eSIM profiles with contents to configure the SIM profiles to perform functionalities selected through user-inputs. The SIM profiles can perform the functionalities after being downloaded to mobile devices. The RSP platform can modify branding elements and/or wireless network selection elements of eSIM profiles. The branding elements can be modified to modify branding information displayed on mobile devices after the eSIM profiles are installed. The wireless network selection elements can be modified to modify the wireless network selection performed by the eSIM profiles.

The RSP platform stores the modified eSIM profile for download to a mobile device (340). The RSP platform can calculate integrity vales for modified SIM profiles after the SIM profiles are modified. The RSP platform can encrypt the integrity vales together with the modified SIM profile before storing the modified SIM profiles in the repository. The RSP platform can provide the modified eSIM profile to the mobile device in response to receiving a request from the mobile device.

Figure 4:
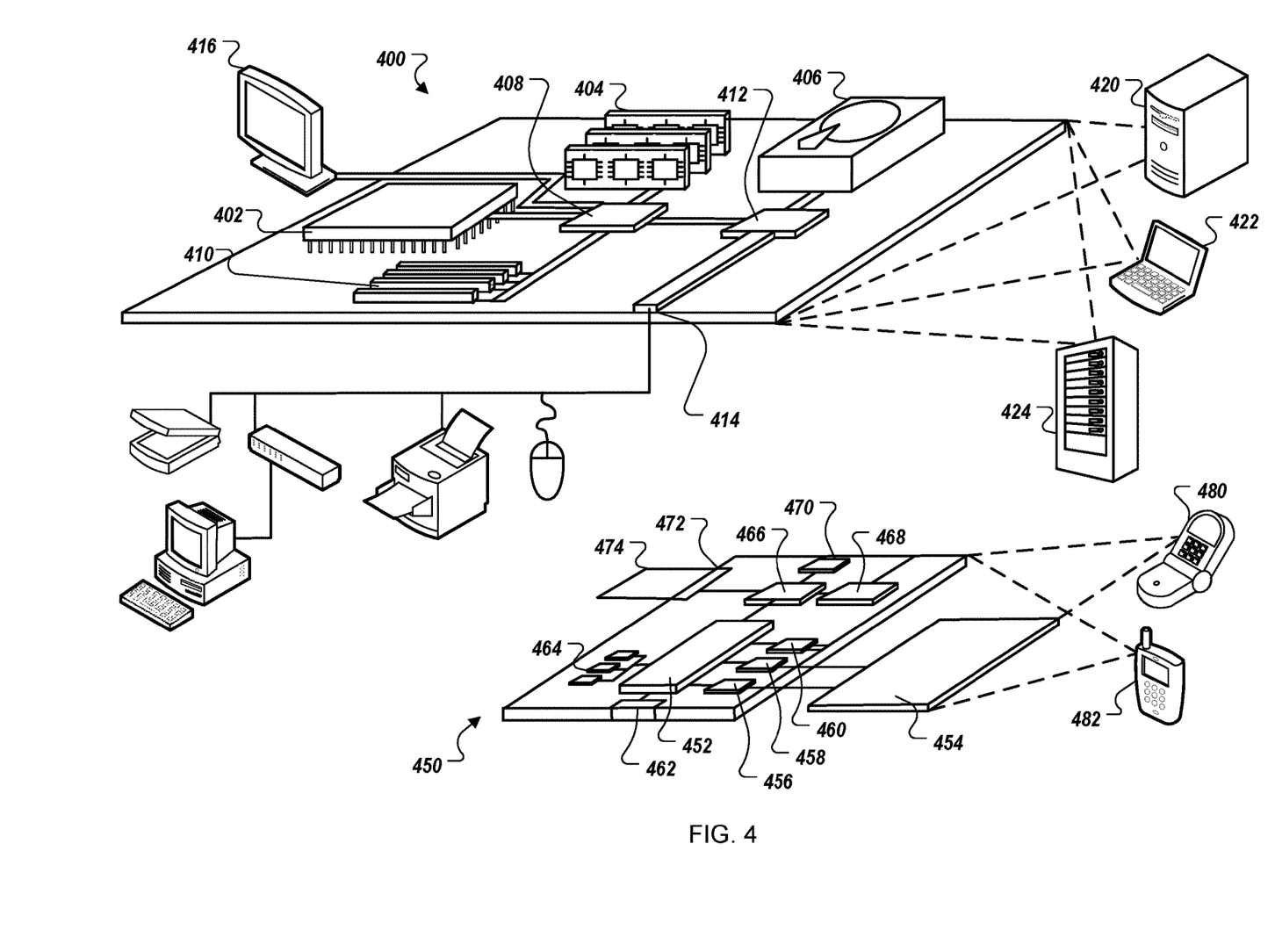
FIG. 4 is a block diagram of a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above. For example, a computing device 400, or a portion thereof, can be used to implement the RSP platform 110, the computing device 120, and/or the mobile device 130 described with reference to FIG. 1. In some examples, a laptop computer 422 can be used to implement the computing device 120 described with reference to FIG. 1. In some examples, a mobile computing device 450 can be used to implement the mobile device 130 described with reference to FIG. 1.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the mobile device described with respect to FIGS. 1-3. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In this specification, the term "repository" refers broadly to refer to any collection of data: the data does not need to be structured in any particular way, or structured at all, and it can be stored on storage devices in one or more locations. Thus, for example, the eSIM profile repository can include multiple collections of data, each of which may be organized and accessed differently.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method comprising:
receiving, by at least one processing device through a user-interface configured to receive user-inputs to modify electronic subscriber identity module (eSIM) profiles stored in a repository, a request to modify at least one eSIM profile, wherein the user-inputs are related to modifying the eSIM profiles prior to the eSIM profiles being downloaded on corresponding mobile devices;
retrieving, by the at least one processing device, the at least one SIM profile from the eSIM profiles in the repository;
modifying, by the at least one processing device, at least one element of the at least one SIM profile in accordance with the request to modify the at least one eSIM profile; and
storing, by the at least one processing device, the modified eSIM profile for download to a mobile device.

2. The method of claim 1, wherein (i) the user-inputs to modify the eSIM profiles modify a display of custom branding information on the mobile device, and (ii) the at least one element of the SIM profile comprises at least one branding element.

3. The method of claim 1, wherein (i) the user-inputs to modify the eSIM profiles modify wireless network selection, and (ii) the at least one element of the eSIM profile comprises at least one wireless network selection element.

4. The method of claim 1, wherein each SIM profile stored in the repository corresponds to a wireless service provider.

5. The method of claim 1, wherein modifying the at least one element of the SIM profile comprises:
decrypting the at least one SIM profile to access elements of the at least one SIM profile;
calculating, after the at least one SIM profile is modified, integrity vales for the modified SIM profile; and
encrypting the integrity vales together with the modified SIM profile.

6. The method of claim 1, wherein the user-interface comprises interactive controls which enable a user to edit contents of the at least one element of the at least one SIM profile.

7. The method of claim 1, wherein the user-interface comprises interactive controls which enable a user to select a functionality from a set of functionalities, the method further comprising, in response to receiving the selection of the functionality, modifying the at least one element with contents to configure the at least one SIM profile to perform the selected functionality after download to the mobile device.

8. The method of claim 1, further comprising, in response to receiving a request from the mobile device, providing the SIM profile to the mobile device.

9. A system comprising:
one or more processors; and
one or more non-transitory storage devices storing instructions that are operable, when executed by the one or more processors, to cause the one or more processors to perform operations comprising:
receiving, through a user-interface configured to receive user-inputs to modify electronic subscriber identity module (eSIM) profiles stored in a repository, a request to modify at least one eSIM profile, wherein the user-inputs are related to modifying the eSIM profiles prior to the eSIM profiles being downloaded on corresponding mobile devices;
retrieving the at least one SIM profile from the eSIM profiles in the repository;
modifying at least one element of the at least one SIM profile in accordance with the request to modify the at least one eSIM profile; and
storing the modified eSIM profile for download to a mobile device.

10. The system of claim 9, wherein (i) the user-inputs to modify the eSIM profiles modify a display of custom branding information on the mobile device, and (ii) the at least one element of the SIM profile comprises at least one branding element.

11. The system of claim 9, wherein (i) the user-inputs to modify the eSIM profiles modify wireless network selection, and (ii) the at least one element of the eSIM profile comprises at least one wireless network selection element.

12. The system of claim 9, wherein each SIM profile stored in the repository corresponds to a wireless service provider.

13. The system of claim 9, wherein modifying the at least one element of the SIM profile comprises:
   decrypting the at least one SIM profile to access elements of the at least one SIM profile;
   calculating, after the at least one SIM profile is modified, integrity vales for the modified SIM profile; and
   encrypting the integrity vales together with the modified SIM profile.

14. The system of claim 9, wherein the user-interface comprises interactive controls which enable a user to edit contents of the at least one element of the at least one SIM profile.

15. The system of claim 9, wherein the user-interface comprises interactive controls which enable a user to select a functionality from a set of functionalities, the operations further comprising, in response to receiving the selection of the functionality, modifying the at least one element with contents to configure the at least one SIM profile to perform the selected functionality after download to the mobile device.

16. The system of claim 9, the operations further comprising, in response to receiving a request from the mobile device, providing the SIM profile to the mobile device.

17. One or more non-transitory computer storage media encoded with computer program instructions that when executed by one or more computers cause the one or more computers to perform operations comprising:
   receiving, through a user-interface configured to receive user-inputs to modify electronic subscriber identity module (eSIM) profiles stored in a repository, a request to modify at least one eSIM profile, wherein the user-inputs are related to modifying the eSIM profiles prior to the eSIM profiles being downloaded on corresponding mobile devices;
   retrieving the at least one SIM profile from the eSIM profiles in the repository;
   modifying at least one element of the at least one SIM profile in accordance with the request to modify the at least one eSIM profile; and
   storing the modified eSIM profile for download to a mobile device.

18. The one or more non-transitory computer storage media of claim 17, wherein (i) the user-inputs to modify the eSIM profiles modify a display of custom branding information on the mobile device, and (ii) the at least one element of the SIM profile comprises at least one branding element.

19. The one or more non-transitory computer storage media of claim 17, wherein (i) the user-inputs to modify the eSIM profiles modify wireless network selection, and (ii) the at least one element of the eSIM profile comprises at least one wireless network selection element.

20. The one or more non-transitory computer storage media of claim 17, wherein each SIM profile stored in the repository corresponds to a wireless service provider.

\* \* \* \* \*